United States Patent [19]

Wenz

[11] Patent Number: 4,702,103
[45] Date of Patent: Oct. 27, 1987

[54] METHOD OF QUALITY GRADING IN UNIFORMITY TESTS OF ROTORS, IN PARTICULAR OF AUTOMOBILE TIRES

[75] Inventor: Friedrich Wenz, Seeheim, Fed. Rep. of Germany

[73] Assignee: Hofmann Werkstatt-Technik GmbH, Pfungstadt, Fed. Rep. of Germany

[21] Appl. No.: 864,915

[22] Filed: May 20, 1986

[30] Foreign Application Priority Data

May 20, 1985 [DE] Fed. Rep. of Germany ....... 3518085

[51] Int. Cl.⁴ ............................................ G01M 17/02
[52] U.S. Cl. ..................................................... 73/146
[58] Field of Search ...................................... 73/146, 8

[56] References Cited

U.S. PATENT DOCUMENTS

| | | | |
|---|---|---|---|
| 3,927,561 | 12/1975 | Schleimann | 73/146 |
| 3,948,004 | 4/1976 | Gruber | 73/146 |
| 4,018,087 | 4/1977 | Wenz | 73/146 |
| 4,134,292 | 1/1979 | Honlinger et al. | 73/146 |
| 4,160,378 | 7/1979 | Himmler | 73/146 |
| 4,311,044 | 1/1982 | Marshall et al. | 73/146 |
| 4,502,328 | 3/1985 | Wood et al. | 73/462 |
| 4,545,239 | 10/1985 | Himmler et al. | 73/146 |

OTHER PUBLICATIONS

Hofmann Report 70, "Tire Uniformity Grading Machine for Car Tires RGM-D," Gebruder Hofmann GmbH & Co. KG.

Primary Examiner—Donald O. Woodiel
Attorney, Agent, or Firm—Fleit, Jacobson, Cohn & Price

[57] ABSTRACT

The invention pertains to a method of quality grading in uniformity tests of rotors, in particular automobile tires, where a force and/or geometric variation function obtained in a measuring run from the rotating rotor is analyzed by comparison with limit values, with the root-mean-square value or the arithmetic mean of the variation function being used for such comparison with limit values.

4 Claims, 2 Drawing Figures

METHOD OF QUALITY GRADING IN UNIFORMITY TESTS OF ROTORS, IN PARTICULAR OF AUTOMOBILE TIRES

BACKGROUND OF THE INVENTION

The invention relates to a method of quality grading in uniformity tests of rotors, in particular of automobile tires. For example, grading tires as premium, high quality, standard and low quality tires.

DESCRIPTION OF PRIOR ART

Automatic tire uniformity tests for automobile tires are basically intended for measurement of radial and lateral force variations produced in the tire contact area by a tire when rolling under load, that is in particular the peak-to-peak values of the radial and lateral force variations, the first to fifth harmonics of the variation function of said radial and lateral force variations, or the peak-to-peak values of radial and lateral run-out. Such values are usually output via screen or printer after measurement. At the same time, it is possible to form four quality grades, or a total quality grade of the tire, as a function of the peak-to-peak values and the first harmonics of radial and lateral force variations. For the test run, the tire under test is accommodated between two half rims, rolling on a load wheel with preset load, with variation functions being determined via load cells (Hofmann Report 70 "Tyre Uniformity Grading Machine for Car Tyres RGM-D," ref. No. 96 313 210 000 198, of Gebruder Hofmann GmbH & Co. KG, D-6102 Pfungstadt). Hofmann Report 70 is incorporated herein by reference thereto.

For quite a long time the conventional method of analysis has been on the basis of peak-to-peak values, which is relatively simple because one single quantity is under consideration. The results thus obtained are indeed useful for judgment of manufacturing quality, but the overall shape of the variation function graph is never taken into account. U.S. Pat. No. 3,948,004 issued Apr. 6, 1986 describes a device for producing an electrical signal indicating what amounts of material are to be removed from a loaded tire based upon either the peak-to-peak radial and lateral force signals or the harmonics of those signals and that patent is incorporated herein by reference thereto.

The shape of the variation function graph is taken into account when the harmonics are determined by analysis of the variation function, i.e., the spectrum of the discrete frequencies contained in said measured function. A problem arises though in determining the limit values since separate limits would be required for every harmonic as a function of their magnitudes the angular positions relative to each other. The resulting ensemble of limit values would be rather difficult to understand and correspondingly difficult to apply to a particular tire grading operation. Therefore, only the first harmonics are used for grading purposes. U.S. Pat. No. 4,018,087 issued Apr. 19, 1977 describes an apparatus to extract the harmonics from the force variation signal and generally the use of harmonic analysis to test the uniformity of the tire; that patent is incorporated herein by reference thereto.

SUMMARY OF THE INVENTION

Therefore, it is the object of the present invention to provide for a method of quality grading in uniformity tests of rotors, in particular of automobile tires, where quality grading is simplified by reduction of the number of limit values needed, although the shape of force and geometric variation graphs determined in measurement is taken into account.

The invention presents a favorable way of analyzing and grading the variation function, both relative to amplitude and shape of the wave function, by one single characteristic quantity. The mean of the variation function utilized in this invention is representative of the "power" produced by the tire rotating on the vehicle as a result of force variations in vertical direction, i.e., radial forces. This power is considered the true exciting quantity and the cause of any effects of tire behavior on the vehicle. Consequently, when used in line with the invention, the mean of the variation function ensures practical quality grading in uniformity tests of rotors, in particular of automobile tires.

BRIEF DESCRIPTION OF THE DRAWINGS

The preferred embodiment of the invention is illustrated in the accompanying drawings wherein further objects and advantages will be apparent when reviewed in conjunction with the accompanying specification wherein.

DESCRIPTION OF THE PREFERRED EMBODIMENT

The present invention relates to a method of quality grading rotors and in particular quality grading tires.

Figure 1:
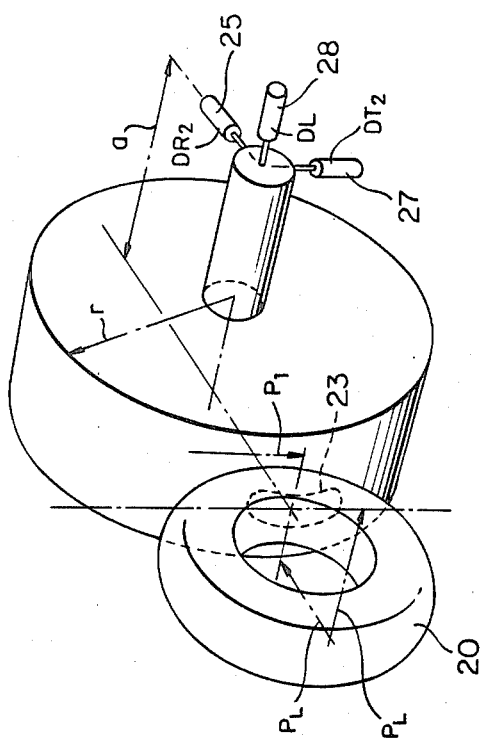
FIG. 1 is a schematic of the tire grading equipment.

FIG. 1 illustrates a schematic of tire grading equipment. Tire 20 is mounted in a conventional fashion on a split rim (not shown) and is capable of rotating about the axis of the rim (also not shown). Lateral force $P_l$ is to be measured and radial force $P_r$ is to be measured while tire 20 is rotated by a test drum 21 having a roll off surface which contacts tire 20 at contact region 23. The centerline of contact is along line $P_l$. Test drum 21 and/or tire 20 is movable such that differing degrees of load can be simulated by the grading equipment. By changing the distance between the two axes of rotation of tire 20 and test drum 21, differing degrees of load are applied to the tire. The grading equipment includes radial pressure sensors $DR_2$ and $DT_2$ and lateral position or pressure sensor DL. Sensors 25, 27 and 28 can be either force-measuring or displacement-measuring sensors or transducers. A detailed description of one type of tire grading equipment is found in U.S. Pat. No. 3,927,561 issued Dec. 23, 1975 which description is incorporated herein by reference thereto. U.S. Pat. No. 4,545,239 issued Oct. 8, 1985 describes sensors mounted on the bearings of the test drum and that patent is incorporated herein by reference thereto. U.S. Pat. No. 4,134,292 issued Jan. 16, 1979 describes a device wherein inductive disturbance distortions in the sensor signals developed during measurement of the lateral and radial force variations are corrected; that patent is incorporated herein by reference thereto.

Figure 2:
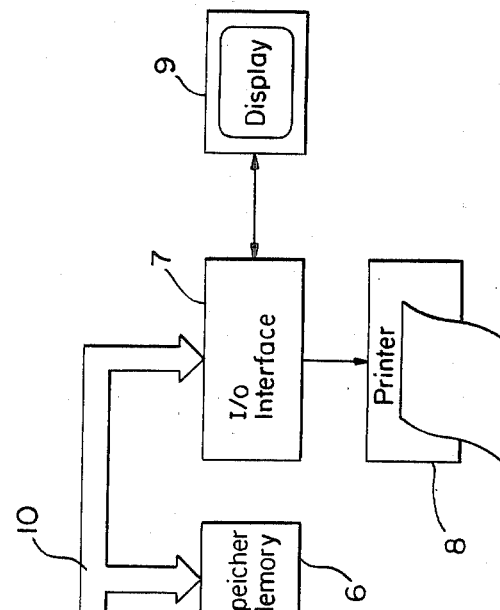
FIG. 2 is a block diagram of the analyzing equipment where the inventive method is put into practice.

In FIG. 2, transducers 1, which are either force-measuring (load cells) or displacement-measuring type, produce electrical signals as a function of radial and lateral force variations and/or radial and lateral run-out. The run-out is the rotation of tire 20 with a minimal load thereon or substantially free running. The signal obtained is fed through the amplifier 2, which may be used for scaling purposes, to low-pass filter 3. At its output the variation function f(t) is available, which is indicative of said corresponding variations or run-out. Said variation function signal f(t) is applied to the input of the analog-digital converter 4. The variation signal f(t) is digitized in the analog-digital converter 4 based in part on the cycle of pulses emitted by the incremental encoder 11. Incremental encoder 11 measures the circumferential position of $P_1$ on the tire. The encoder can be associated with the test drum 21 or the shaft upon which the tire is mounted. A position sensing mechanism for a rotating tire is described in U.S Pat. No. 4,502,328 issued Mar. 5, 1985 and that patent is incorporated herein by reference thereto. The encoder produces position signals that are digitized in interface 12 and made available to CPU 5 via data bus 10. The position signals are monitored by CPU 5 in conjunction with the variation function f(t), via A/D converter 4. CPU 5 executes programs stored in memory 6 and also uses memory 6 as a store of preset values, as a storage for intermediate values and final values. Data signals are carried in a customary fashion on bus 10. The incremental encoder supplies, for example, 360 pulses per revolution of the tire; of course, it is also possible to supply another number of time increments such as 180, 512, or the like, per period or rev.

The mean of force variation is formed in the CPU 5 on the basis of information, stored in memory 6, where the root-mean-square value is formed based upon the following equation $$KV(\overline{Q}) = \sqrt{\frac{1}{T_o} \int_o^T f^2(t)dt}$$

or the arithmetic mean based upon the following equation $$KV(\overline{L}) = \frac{1}{T_o} \int_o^T |f(t)|dt$$

where
 $KV(\overline{Q})$ = root-mean-square value of force variation
 $KV(\overline{L})$ = arithmetic mean of force variation.
 T = period or with f(t) denoting RFV(t), the radial force variation, or LFV(t), the lateral force variation.

The values thus determined are forwarded through data bus 10 to memory 6 where they are stored for further processing. At the same time they can be passed through I/O interface 7 to display screen 9 and/or printer 8.

The analyzing procedure according to the invention is carried out alone, or in combination with conventional analyses, such as on the basis of peak-to-peak values and the first harmonic of the variation function. Since a single characteristic quantity, the mean of the force variation, is required for analysis in line with the invention, it is sufficient to determine limit values for that single characteristic quantity.

For example, the analysis equipment illustrated in FIG. 2 can be programmed, by using CPU 5 and memory 6, to produce and display peak-to-peak values in a conventional fashion. Further, the first harmonic of the variation function can be obtained by executing the appropriate program in CPU 5 and storing the results in memory 6 and displaying the same on one of the display devices. The limit values for the peak-to-peak data can be stored in memory 6 and the resulting quality grade obtained by comparing those values can be displayed. Similarly, the limit values for the first harmonic of the variation function can be stored, the first harmonic data can be compared against those limits and the quality grade computed. However, the present invention goes further in that the entire variation function sine wave is analyzed to obtain the mean of the force variation, either the root-mean-square value or the arithmetic mean. The mean of the force variation function can be compared with predetermined limit values, previously stored in memory 6, and the results can be displayed at printer 8 or display screen 9. Therefore, the present invention monitors the entire force variation wave, obtains the mean of that force variation signal, applies the limit values to that computed mean value, and produces a tire grade for the tire being tested.

What is claimed is:

1. A method of quality grading a rotary article such as a vehicle tire comprising rotating the article and during rotation of the article imposing load variations on the article, using the load variations to generate a variation function representing article quality, deriving root mean square or arithmetic mean values of the variation function and comparing the root mean square or arithmetic mean values with prescribed limit values for the function.

2. The method as defined in claim 1 wherein the variation function is a force function.

3. The method as defined in claim 1 wherein the variation function is a geometric function.

4. The method as defined in claim 1 wherein the variation function is generated in analog terms, digitalized in intervals of given time increments per period and then stored for the deriving and comparing steps.

* * * * *